United States Patent
Yadav

(10) Patent No.: US 11,075,919 B2
(45) Date of Patent: Jul. 27, 2021

(54) SYSTEM AND METHOD FOR PROVIDING PROXIMITY ALERT FOR TRUSTED VISITOR

(71) Applicant: ARRIS Enterprises LLC, Suwanee, GA (US)

(72) Inventor: Girdhari Lal Yadav, Rajasthan (IN)

(73) Assignee: ARRIS Enterprises LLC, Suwanee, GA (US)

( * ) Notice: Subject to any disclaimer, the term of this patent is extended or adjusted under 35 U.S.C. 154(b) by 401 days.

(21) Appl. No.: 16/192,201

(22) Filed: Nov. 15, 2018

(65) Prior Publication Data
US 2020/0162476 A1 May 21, 2020

(51) Int. Cl.
H04L 29/06 (2006.01)
H04L 9/08 (2006.01)
H04W 12/63 (2021.01)
H04W 12/72 (2021.01)
H04W 12/084 (2021.01)
H04W 8/18 (2009.01)

(52) U.S. Cl.
CPC .......... *H04L 63/105* (2013.01); *H04L 9/0866* (2013.01); *H04L 63/0272* (2013.01); *H04L 63/101* (2013.01); *H04W 8/18* (2013.01); *H04W 12/084* (2021.01); *H04W 12/63* (2021.01); *H04W 12/72* (2021.01)

(58) Field of Classification Search
CPC . H04L 63/105; H04L 9/0866; H04L 63/0272; H04L 63/101; H04W 8/18; H04W 12/63; H04W 12/72; H04W 12/084; H04W 12/69; H04W 84/12
See application file for complete search history.

(56) References Cited

U.S. PATENT DOCUMENTS 8,780,201 B1   7/2014 Scalisi et al.
9,258,712 B2 * 2/2016 Kiukkonen ........... H04W 12/08
(Continued)

OTHER PUBLICATIONS

Notification of Transmittal of the International Search Report (Form PCT/ISA/220 and PCT/ISA/210) and the Written Opinion of the International Searching Authority (Form PCT/ISA/237) dated Feb. 20, 2020, by the European Patent Office in corresponding International Application No. PCT/US2019/060526. (14 pages).

*Primary Examiner* — Christopher A Revak
(74) *Attorney, Agent, or Firm* — Buchanan, Ingersoll & Rooney, PC

(57) ABSTRACT

A wireless communication device includes a network component, a wireless communication component, a memory, a trusted visitor management component and a primary user notification component. The network component can establish a primary wireless local area network and can establish a trusted visitor wireless local area network. The wireless communication component can receive a primary user identification and can receive a trusted visitor identification. The trusted visitor management component can generate a permission based on a stored trusted visitor identification and the trusted visitor identification. The primary user notification component can generate a primary user notification based on the permission. The network component can connect a trusted visitor wireless communication device to the trusted visitor wireless local area network based on the permission.

17 Claims, 13 Drawing Sheets

(56) References Cited

U.S. PATENT DOCUMENTS

| | | | |
|---|---|---|---|
| 9,674,187 B1* | 6/2017 | Ngo | H04W 12/08 |
| 2004/0229569 A1 | 11/2004 | Franz | |
| 2006/0190991 A1* | 8/2006 | Iyer | H04L 63/083 |
| | | | 726/3 |
| 2015/0139210 A1* | 5/2015 | Marin | H04W 48/16 |
| | | | 370/338 |
| 2015/0350910 A1* | 12/2015 | Eramian | H04W 12/50 |
| | | | 726/6 |
| 2016/0021116 A1* | 1/2016 | Maguire | H04L 63/102 |
| | | | 726/4 |
| 2016/0021205 A1 | 1/2016 | Mower | |
| 2016/0226842 A1 | 8/2016 | Mower | |

* cited by examiner

SYSTEM AND METHOD FOR PROVIDING PROXIMITY ALERT FOR TRUSTED VISITOR

BACKGROUND

Embodiments of the invention relate to devices and methods for operating a dual wireless network, that includes a first wireless network having a first set of privileges and a second wireless network having a second set of privileges that may be more limited than the first set of privileges.

There exists a need for a system and method for monitoring connection and disconnection of members of a second wireless network within a dual wireless network.

SUMMARY

Aspects of the present invention are drawn to a system and method for monitoring connection and disconnection of members of a second wireless network within a dual wireless network, and alerting a member of a first wireless network in the dual wireless network of the connection and disconnection of members.

An aspect of the present invention is drawn to a wireless communication device for use with a primary user wireless communication device and a trusted visitor wireless communication device. The wireless communication device includes a network component, a wireless communication component, a memory, a trusted visitor management component and a primary user notification component. The network component can establish a primary wireless local area network and can establish a trusted visitor wireless local area network. The wireless communication component can receive the primary user identification and can receive the trusted visitor identification. The memory can store a stored trusted visitor identification. The trusted visitor management component can generate a permission based on the stored trusted visitor identification and the trusted visitor identification. The primary user notification component can generate a primary user notification based on the permission. The network component can connect the trusted visitor wireless communication device to the trusted visitor wireless local area network based on the permission.

BRIEF SUMMARY OF THE DRAWINGS

The accompanying drawings, which are incorporated in and form a part of the specification, illustrate example embodiments and, together with the description, serve to explain the principles of the invention. In the drawings.

DETAILED DESCRIPTION

Figure 1:
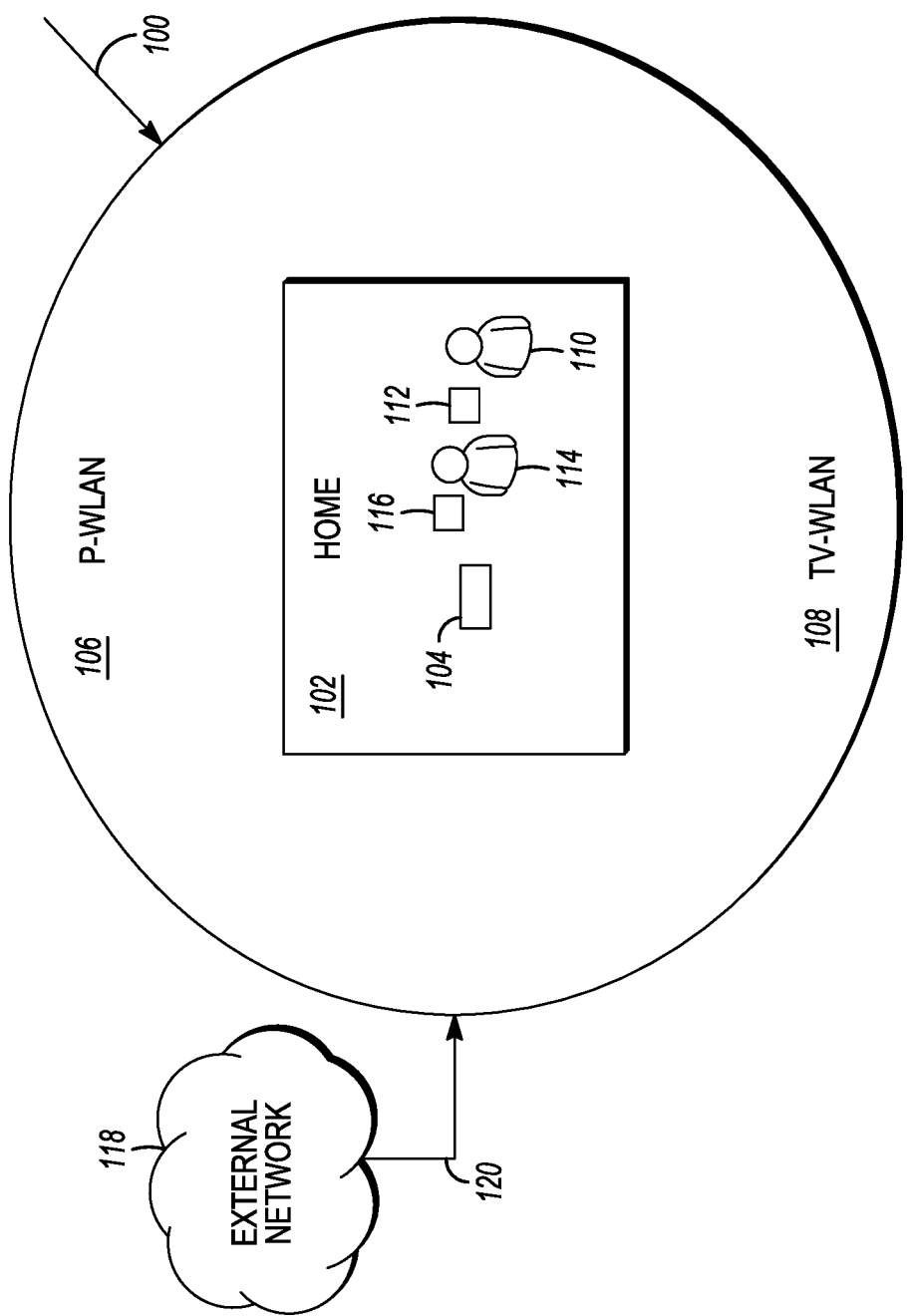
FIG. 1 illustrates a prior art home local area network (LAN) at a time $t_1$.

A purpose of a system and method in accordance with aspects of the present invention is to alert a home user about a trusted visitor, by detecting when the trusted visitor comes within a trusted zone so as to connect to a trusted visitor wireless LAN (TV-WLAN) of the home.

A Wi-Fi passphrase for the TV-WLAN can be shared with trusted visitors of the home user, e.g., friends and family, for their use of the Wi-Fi while they visit (e.g., using their mobile phones). At the same time, a wireless network device adds these Wi-Fi clients to a trusted zone wireless network. The client details (e.g., MAC address) of trusted visitors are stored on the wireless network device even after the clients are disconnected.

When the wireless network device again detects the proximity of these trusted visitors using the Wi-Fi associate request of their mobile phones, the modem alerts the home user to the presence of the trusted visitors.

Two non-limiting use case scenarios will be described herein, one for security and one for a missed visit alert, as will be described in greater detail below.

As for security, the wireless network device detects the Wi-Fi associate request from the mobile phone of the trusted visitor as soon as he/she is nearby or outside the house. The wireless network device immediately looks up the information from memory regarding previously registered trusted visitors and identifies the visitors. The wireless network device alerts the home user as to the identity of the nearby visitor. Accordingly, the home user will be aware of who is ringing the doorbell without even going near the door.

As mentioned above, for the missed visit alert, the wireless network device detects that the home user has left the house by his/her mobile phone's Wi-Fi disassociate request. This will initiate the missed visit alert feature. The wireless network device detects the Wi-Fi associate request from the mobile phone of the trusted visitor, or the Wi-Fi associate requests from mobile phones of a plurality of trusted visitors. The wireless network device searches the memory and identifies the visitors. The wireless network device then stores this as a missed visit and records the time of the event. The wireless network device detects when the home user has returned to the house by his/her mobile phone's Wi-Fi associate request, and informs the home user of the missed visit.

The wireless network device may alert the home user in many ways. The wireless network device can use the home user's smartphone to deliver the alert. For example, in the security case, the wireless network device can deliver a popup to the home user's mobile phone when the wireless network device detects the Wi-Fi associate request from the mobile phone of the trusted visitor. Further, in the case of the missed visit alert, the wireless network device can deliver a popup to the mobile phone when it detects that the home user's phone is trying to associate again after returning home. The wireless network device can use a telephony module to alert the home user (e.g., by a ring-splash) to the proximity of a trusted visitor. Further, the wireless network device can deliver the alert to a compatible set-top box that can then display the alert on a television screen. In some example embodiment, the ring-splash or set-top box example methods discussed above may be used when the wireless network device detects trusted visitor, whereas a popup may be provided to the home user's mobile phone for instances of a missed visit from a trusted visitor.

A prior art system and method of operating a dual wireless network will now be described with reference to FIGS. 1-6.

FIG. 1 illustrates a prior art home local area network (LAN) 100 at a time $t_1$.

As shown in FIG. 1, prior art home LAN 100 includes a home 102, a network device 104, a primary wireless local area network (P-WLAN) 106, a trusted visitor wireless local area network (TV-WLAN) 108, a home user 110, a wireless communication device 112 of home user 110, a visitor 114, a wireless communication device 116 of visitor 114 and an external network 118.

Network device 104 is any device or system that is able to establish and manage P-WLAN 106, establish and manage TV-WLAN 108, and communicate with external network 118 via a communication channel 120.

P-WLAN 106 and TV-WLAN 108 generally employ a layered protocol (e.g., make use of what are called protocol stacks or layered protocols (e.g., the Open Systems Interconnection (OSI) model). Networks generally employ such layered network protocols to accommodate a vast diversity of systems and physical devices (e.g., diverse platforms, such as computers running various operating systems, smart phones, entertainment systems, etc., and diverse forms of physical connection such as various types of wired connections, wireless connections, fiber optics, etc.). In a layered protocol, each layer is responsible for a particular kind of functionality, and each layer depends on the layers below it for other functions and provides services to the layers above it. In accordance with such a layered system, a given service can be used by multiple versions of the layer above it, and can make use of multiple versions of the layer below it. For example, in view of current large and complex systems that are constantly being updated, the layered protocol provides for the ability to change the implementation of a service without affecting other components of the system, and also different services can be implemented at each layer and can be modified or replaced without affecting the services of the other layers.

The OSI model includes seven independent protocol layers: (1) Layer 1, the physical layer, which defines electrical and physical specifications for devices, and the relationship between a device and a transmission medium, such as a copper or fiber optical cable; (2) Layer 2, the data link layer, which provides the functional and procedural means for the transfer of data between network entities and the detection and correction of errors that may occur in the physical layer; (3) Layer 3, the network layer, which provides the functional and procedural means for transferring variable length data sequences from a source host on one network to a destination host on a different network (in contrast to the data link layer which connects hosts within the same network), and performs network routing functions and sometimes fragmentation and reassembly; (4) Layer 4, the transport layer, which provides transparent transfer of data between end users, providing reliable data transfer services to the upper layers by controlling the reliability of a given link through flow control, segmentation/desegmentation, and error control; (5) Layer 5, the session layer, which controls the connections (interchanges) between computers, establishing, managing and terminating the connections between the local and remote applications; (6) Layer 6, the presentation layer, which establishes context between application layer entities, by which the higher-layer entities may use different syntax and semantics when the presentation service provides a mapping between them; and (7) Layer 7, the application layer, which interacts directly with the software applications that implement the communicating component.

Generic Stream Encapsulation (GSE) provides a data link layer protocol, which facilitates the transmission of data from packet oriented protocols (e.g., Internet protocol or IP) on top of a unidirectional physical layer protocol (e.g., DVB-S2, DVB-T2 and DVB-C2). GSE provides functions/characteristics, such as support for multi-protocol encapsulation (e.g., IPv4, IPv6, MPEG, ATM, Ethernet, VLANs, etc.), transparency to network layer functions (e.g., IP encryption and IP header compression), and support of several addressing modes, a mechanism for fragmenting IP datagrams or other network layer packets over baseband frames, and support for hardware and software filtering.

In a layered system, a unit of data that is specified in a protocol of a given layer (e.g., a "packet" at the network layer), and which includes protocol-control information and possibly user data of that layer, is commonly referred to as a "protocol data unit" or PDU. At the network layer, data is formatted into data packets (e.g., IP datagrams, Ethernet Frames, or other network layer packets).

Wireless communication device 112 may be any device or system that is able to wirelessly connect to and communicate through P-WLAN 106. Wireless communication device 116 may be any device or system that is able to wirelessly connect to and communicate through TV-WLAN 108. Non-limiting examples of wireless communication devices 112 and 116 include smartphones, laptop computers and tablets.

External network 118 may include one or more public communications networks, such as the Internet or a public switched telephone network (PSTN).

Operation of prior art home LAN 100 will now be described in greater detail with reference to FIGS. 2-6.

Figure 2:
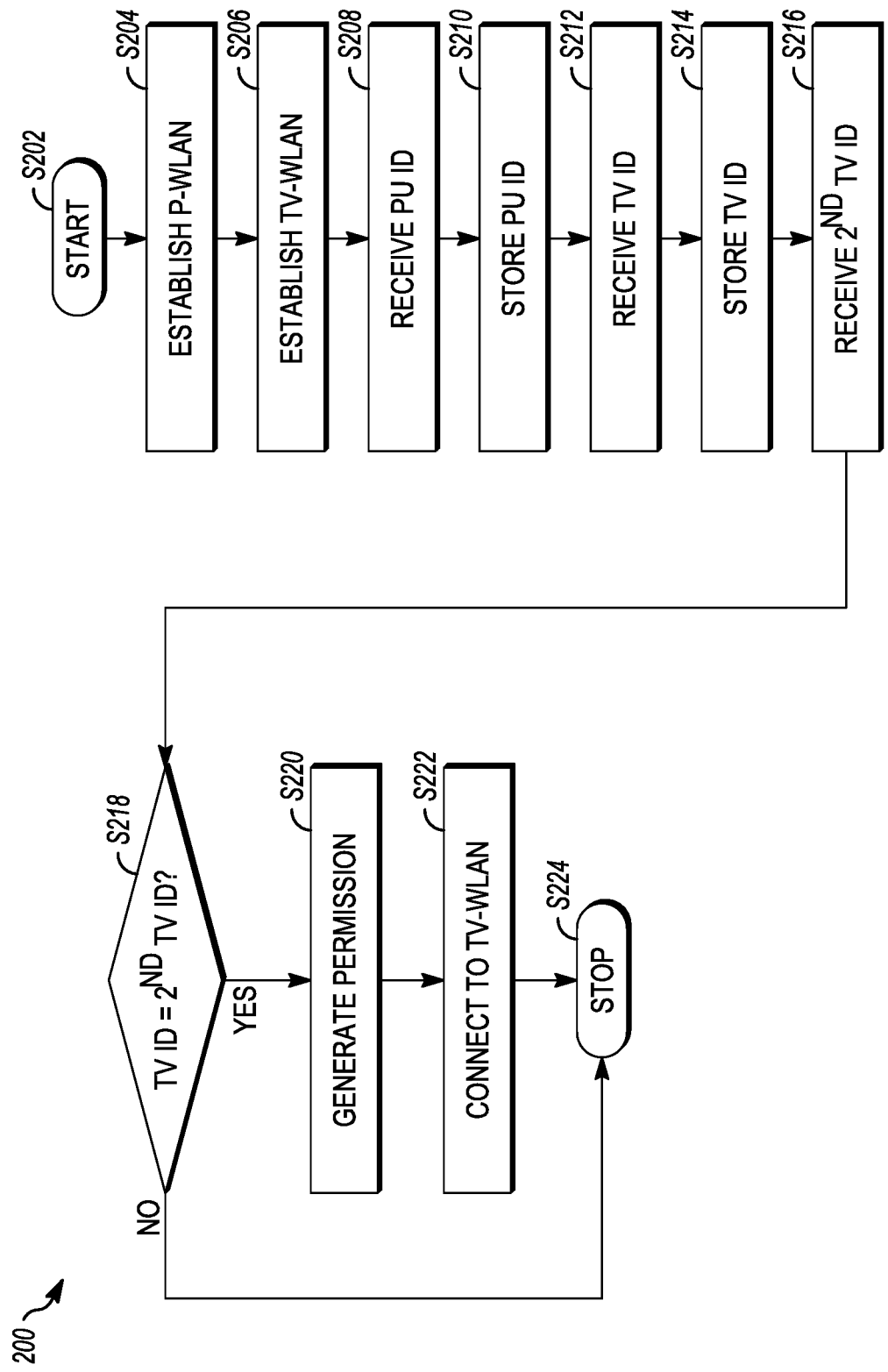
FIG. 2 illustrates a prior art method of operating a dual wireless network.

FIG. 2 illustrates a prior art method 200 of operating a dual wireless network.

As shown in FIG. 2, prior art method 200 starts (S202) and P-WLAN is established (S204). This will be described in greater detail with reference to FIG. 3.

Figure 3:
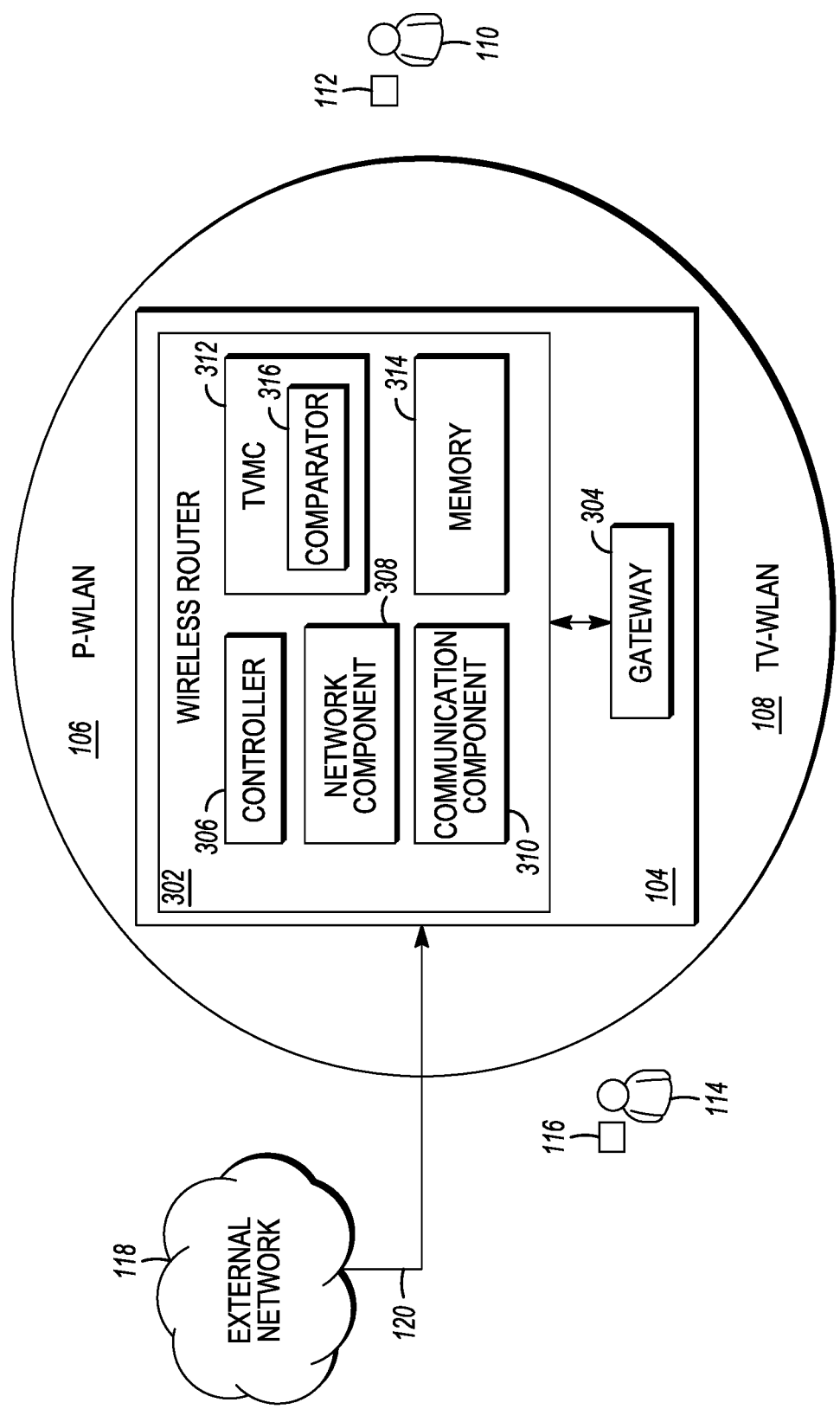
FIG. 3 illustrates an exploded view of the network device of FIG. 1.

FIG. 3 illustrates an exploded view of network device 104 of FIG. 1.

As shown in FIG. 3, network device 104 includes a wireless router 302 and a gateway 304. Wireless router 302 includes a controller 306, a network component 308, a communication component 310, a trusted visitor management component (TVMC) 312 and a memory 314. TVMC 312 includes a comparator 316.

In this example, wireless router 302 and gateway 304 are illustrated as individual devices. However, in some embodiments, wireless router 302 and gateway 304 may be combined as a unitary device. Further, in some embodiments, at least one of wireless router 302 and gateway 304 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an application specific integrated circuit ("ASIC"). In the alternative, the processor and the tangible computer-readable media may reside as discrete components.

Non-limiting example systems include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Wireless router 302 may be any device or system that is able to forward data packets between similar networks. Wireless router 302 is able to establish wireless networks for communication with wireless communication device 112 and wireless communication device 116.

Gateway 304 may be any device or system that is able to provide a remote network with connectivity to a dissimilar host network. Wireless router 302 is able to connect wireless communication device 112 and wireless communication device 116 to external network 118 via communication channel 120. Communication channel 120 may be a wired or wireless communication channel.

Gateway 304 may perform such functions as link layer and physical layer outroute coding and modulation (e.g., DVB S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

In this example, controller 306, network component 308, communication component 310, TVMC 312 and memory 314 are illustrated as individual devices. However, in some embodiments, at least two of controller 306, network component 308, communication component 310, TVMC 312 and memory 314 may be combined as a unitary device. Further, in some embodiments, at least one of controller 306, network component 308, communication component 310, TVMC 312 and memory 314 may be implemented as a computer having tangible computer-readable media for carrying or having computer-executable instructions or data structures stored thereon.

Controller 306 may be any device or system that is able to control operation of network component 308, communication component 310, TVMC 312 and memory 314.

Network component 308 may be any device or system that is able to establish and manage P-WLAN 106 and to establish and manage TV-WLAN 108. As will be described in greater detail below, network component 308 is further able to connect a trusted visitor wireless communication device to TV-WLAN 108 based on permission and to detect a disconnection of a primary user wireless communication device from P-WLAN 106.

Communication component 310 may be any device or system that is able to wirelessly transmit and receive communications with wireless communication device 112, to wirelessly transmit and receive communications with wireless communication device 116 and to transmit and receive communications with gateway 304. As will be described in more detail below, communication component 310 is further able to receive a primary user identification, receive a trusted visitor identification, receive a subsequent trusted visitor identification and receive a subsequent primary user identification.

TVMC 312 may be any device or system that is able to register trusted visitors to TW-WLAN 108, identify registered trusted visitors and connect identified registered trusted visitors to TV-WLAN 108. As will be described in more detail below, TVMC 312 is further able to generate a permission based on the stored trusted visitor identification and a subsequently received trusted visitor identification, to compare, via a comparator, the subsequently received trusted visitor identification with the stored trusted visitor identification, to generate the permission as a trusted visitor permission when the trusted visitor identification corresponds to the stored trusted visitor identification, to generate the permission as an untrusted visitor permission when the trusted visitor identification does not correspond to the stored trusted visitor identification, to compare, via the comparator, the trusted visitor identification with a second stored trusted visitor identification, to generate the permission as a trusted visitor permission when the trusted visitor identification corresponds to the second stored trusted visitor identification and to generate the permission as an untrusted visitor permission when the trusted visitor identification does not correspond to the stored trusted visitor identification and does not correspond to the second stored trusted visitor identification.

Comparator 316 may be any device or system that is able to compare data. As will be described in more detail below, comparator 316 is additionally able to compare a trusted visitor identification with a stored trusted visitor identification.

Memory 314 may be any device or system that is able to store and manage data. As will be described in greater detail below, memory 314 is further able to store a stored trusted visitor identification and to store a second stored trusted visitor identification.

In operation, network component 308 may establish P-WLAN 106 by any known manner. In a non-limiting example, for purposes of discussion herein, network component 308 establishes P-WLAN 106 as a Wi-Fi wireless network for use in and around home 102.

P-WLAN 106 is a network in which a predetermined primary user, or users, may have access. For purposes of discussion herein, the predetermined primary user is home user 110, or more accurately, wireless communication device 112 of home user 110. As a member of P-WLAN 106, wireless communication device 112 may have predetermined roles and privileges, non-limiting examples of which include access to certain databases, the ability to read/change passwords, and access to improved processing resources.

Returning to FIG. 2, after a P-WLAN is established (S204), a TV-WLAN is established (S206). For example, as shown in FIG. 3, component 308 may establish TV-WLAN 108 by any known manner. In a non-limiting example, for purposes of discussion herein, network component 308 establishes TV-WLAN 108 as a Wi-Fi wireless network for use in and around home 102. The area for which a wireless communication device can connect and maintain connection to TV-WLAN 108 is a trusted zone.

TV-WLAN 108 is a network in which a trusted visitor, or trusted visitors, may have access. For purposes of discussion herein, the trusted visitor is visitor 114, or more accurately, wireless communication device 116 of visitor 114. As a member of TV-WLAN 108, wireless communication device 116 may have more limited predetermined roles and privileges as compared to the predetermined roles and privileges of wireless communication device 112 of TV-WLAN 108. For example: wireless communication device 116 may not have access to certain databases of which wireless communication device 112 has access through P-WLAN 106; wireless communication device 116 may not have the ability to read/change passwords of which wireless communication device 112 may have the ability to read/change through P-WLAN 106; or wireless communication device 116 may be relegated to a much lower bandwidth for uploading or downloading data as compared to wireless communication device 112 through P-WLAN 106.

Returning to FIG. 2, after the TV-WLAN is established (S206), a primary user identification (PU ID) is received (S208). In an example embodiment, wireless communication component 310 receives the PU ID.

For example, as shown in FIG. 3, once P-WLAN 106 is established, home user 110 may connect wireless communication device 112 thereto by known methods. Such known methods may include searching for detectable wireless networks with wireless communication device 112. When P-WLAN 106 is identified, home user 110 may take necessary steps to connect wireless communication device 112 to P-WLAN 106. In a conventional example, the connection is accomplished by pressing a "Connect" button on a user interface (not shown) of wireless communication device 112.

In the process of connecting, there is a handshake between network component 308 and wireless communication device 112 by way of communication component 310. In particular, wireless communication device 112 transmits a PU ID, which identifies wireless communication device 112, to communication component 310 which then provides the PU ID to network component 308.

Returning to FIG. 2, after the PU ID is received (S208), the PU ID is stored (S210). For example, as shown in FIG. 3, controller 306 instructs network component 308 to store the PU ID in memory 314. Memory 314 may additionally store therein, passwords for each of P-WLAN 106 and TV-WLAN 108.

Returning to FIG. 2, after the PU ID is stored (S210), a trusted visitor identification (TV ID) is received (S212). In an example embodiment, communication component 310 receives the TV ID.

For example, as shown in FIG. 3, once TV-WLAN 108 is established, visitor 114 may connect wireless communication device 116 thereto by known methods. Such known methods may include searching for detectable wireless networks with wireless communication device 116. When TV-WLAN 108 is identified, home user 110 may provide visitor 114 with the password to connect wireless communication device 116 to TV-WLAN 108. In a conventional example, the connection is accomplished by pressing a "Connect" button on a user interface (not shown) of wireless communication device 116.

In the process of connecting, there is a handshake between network component 308 and wireless communication device 116 by way of communication component 310. In particular, wireless communication device 116 transmits a TV ID, which identifies wireless communication device 116, to communication component 310 which then provides the TV ID to network component 308.

Returning to FIG. 2, after the TV ID is received (S212), the TV ID is stored (S214). In an example embodiment, the TV ID is stored in memory 314. For example, as shown in FIG. 3, network component 308 sends the TV ID to memory 314 for storage.

Figure 4:
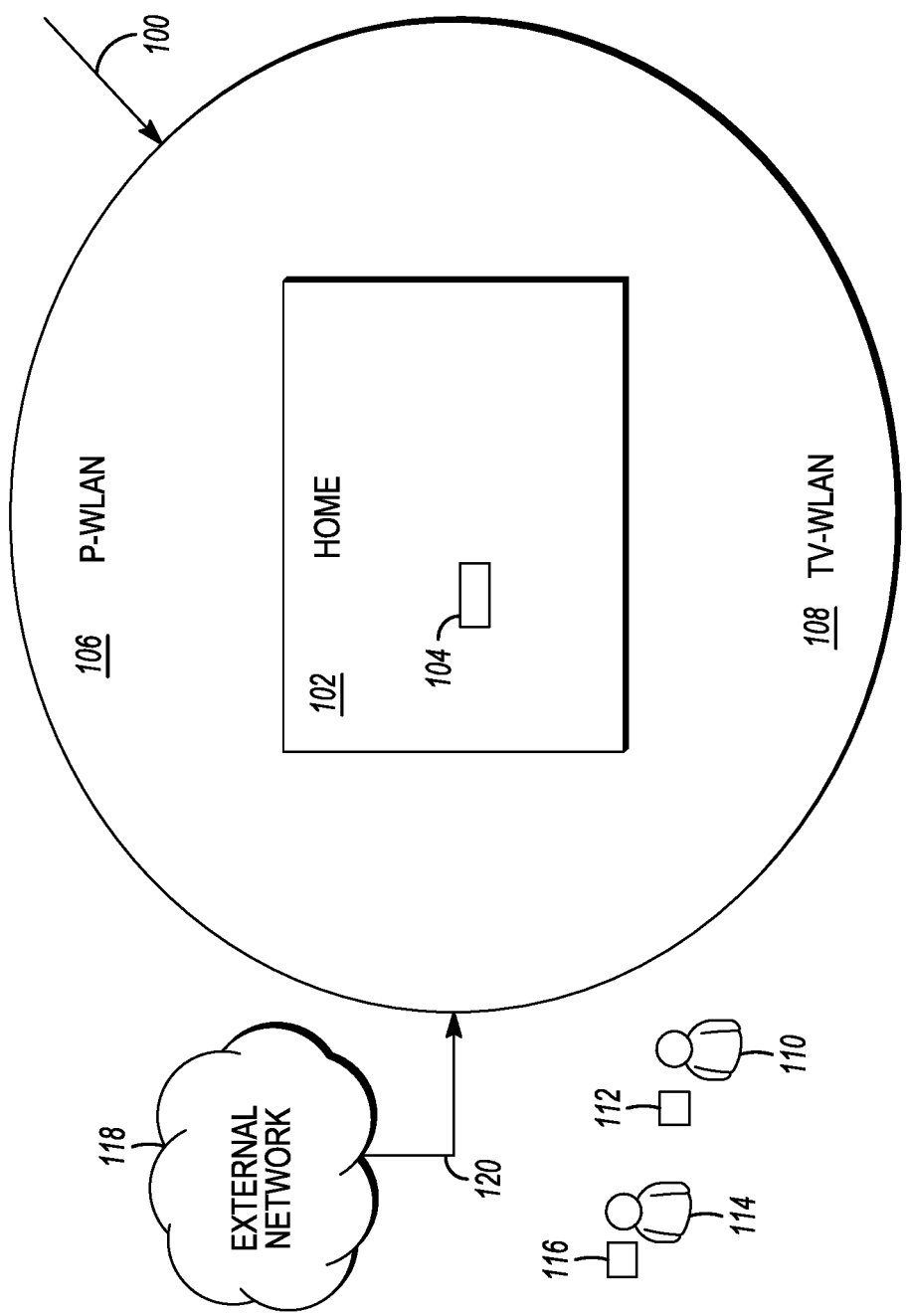
FIG. 4 illustrates the prior art home LAN of FIG. 1 at a time $t_2$.

FIG. 4 illustrates prior art home LAN 100 at a time $t_2$. For purposes of discussion, consider the situation where home user 110 and visitor 114 have left home 102. At this point, wireless communication device 112 of home user 110 has disconnected from P-WLAN 106 and wireless communication device 116 of visitor 114 has disconnected from TV-WLAN 108.

For purposes of discussion, at a later time, consider the situation where home user 110 returns to home 102, whereas visitor 114 does not return to home 102. This will be described with reference to FIG. 5.

Figure 5:
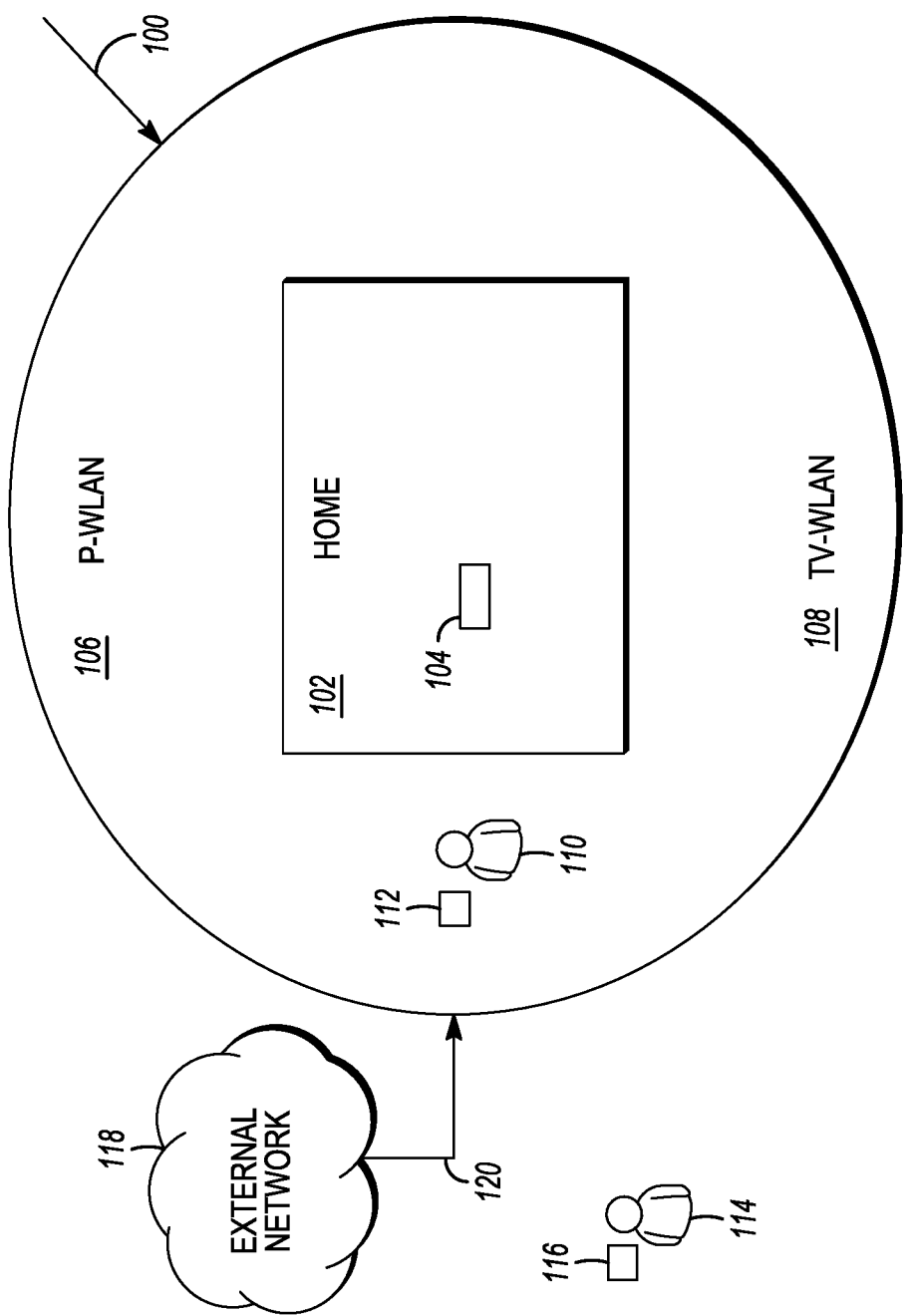
FIG. 5 illustrates the prior art home LAN of FIG. 1 at a time $t_3$.

FIG. 5 illustrates prior art home LAN 100 at a time $t_3$. At this point, wireless communication device 112 of home user 110 reconnects with P-WLAN 106 whereas wireless communication device 116 of visitor 114 does not reconnect with TV-WLAN 108.

For purposes of discussion, at an even later time, consider the situation where visitor 114 returns to home 102. This will be described with reference to FIG. 6.

Figure 6:
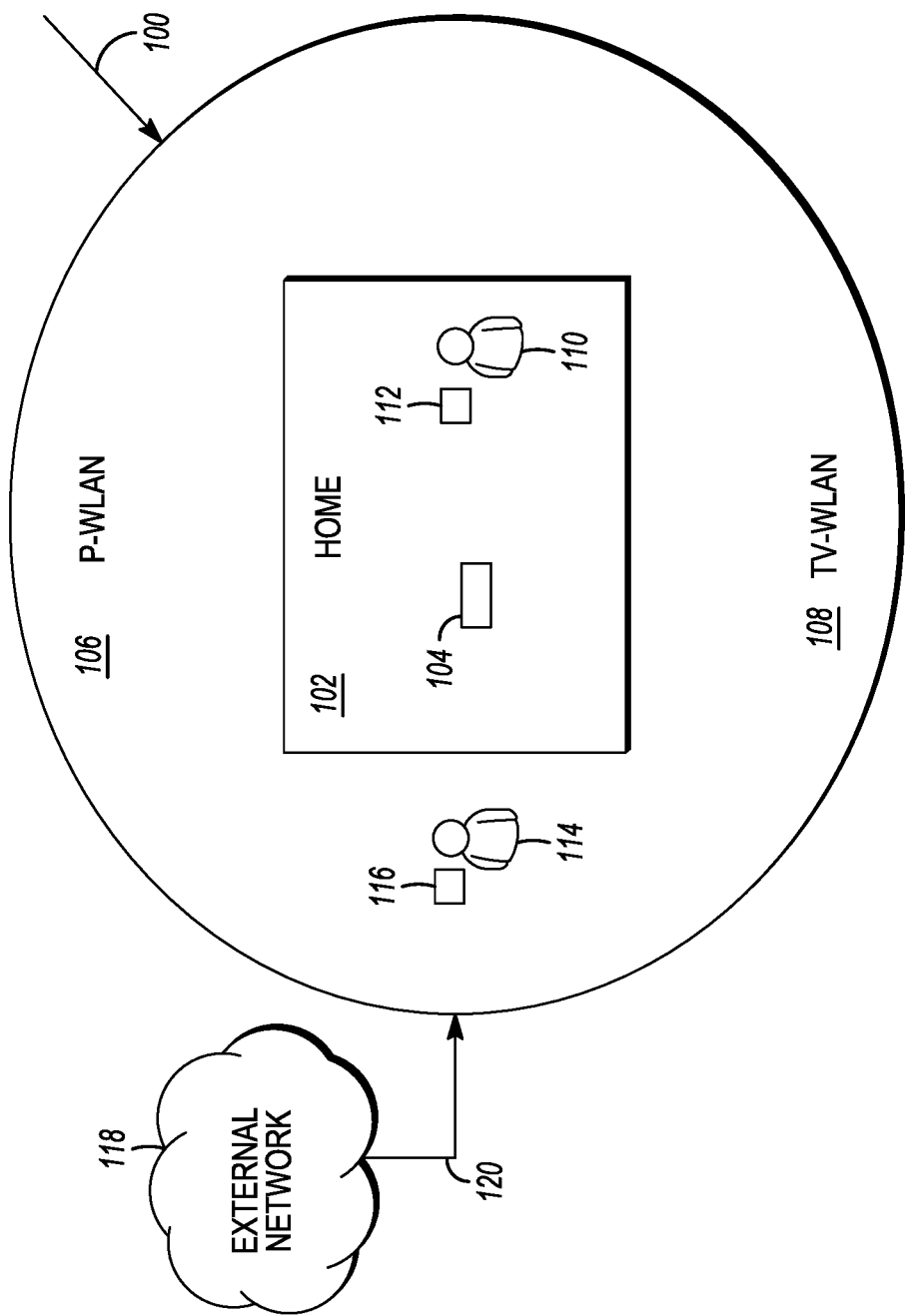
FIG. 6 illustrates the prior art home LAN of FIG. 1 at a time $t_4$.

FIG. 6 illustrates prior art home LAN 100 at a time $t_4$. At this point, home user 110 is in home 102 and wireless communication device 112 is connected to P-WLAN 106. As soon as visitor 114 is within range of TV-WLAN 108, communication device 116 will attempt to connect to TV-WLAN 108.

Returning to FIG. 2, after the TV ID is stored (S214), a second TV ID is received (S216). In an example embodiment, communication component 310 receives a second TV ID.

For example, as shown in FIG. 3, when visitor 114 is close enough to home 102, wireless communication device 116 will detect TV-WLAN 108. User 114 may then want to connect to TV-WLAN 108, having been connected to TV-WLAN 108 before (for example, at time $t_1$ discussed above with reference to FIG. 1).

Again, in the process of connecting, there is a handshake between network component 308 and wireless communication device 116 by way of communication component 310. Wireless communication device 116 again, for a second time, transmits the TV ID of wireless communication device 116, which identifies wireless communication device 116, to communication component 310 which then provides the second TV ID to network component 308.

Returning to FIG. 2, after the second TV ID is received (S216), it is determined whether the TV ID is the same as the second TV ID (S218).

For example, as shown in FIG. 3, TVMC 312 retrieves the previously stored TV ID associated with wireless communication device 116 from memory 314. TVMC 312 provides the second TV ID that has been received from communication device 116 and the previously stored TV ID from memory 314 to comparator 316. Comparator 316 then compares the second TV ID that has been received from communication device 116 and the previously stored TV ID.

Returning to FIG. 2, if it is determined that the TV ID is not the same as the second TV ID (N at S218), then prior art method 200 stops (S224). In an example embodiment, trusted visitor management component generates a permission based on the stored trusted visitor identification and the second received trusted visitor identification, wherein the permission is generated as an untrusted visitor permission when the trusted visitor identification does not correspond to the stored trusted visitor identification.

For example, as shown in FIG. 3, TVMC 312 generates a permission based on the second received TV ID and the previously stored TV ID from memory 314. If comparator 316 determines the second received TV ID is not the same as the previously stored TV ID from memory 314, the TVMC 312 provides an untrusted visitor permission to network component 308. When network component 308 receives an untrusted visitor permission in response to a received TV ID from a wireless communication device seeking to connect with TV-WLAN 108, the network component 308 denies the connection.

In the situation where the second received TV ID does not correspond to the previously stored TV ID, then the wireless communication device that is attempting to connect with TV-WLAN 108 is not a communication device that has previously connected with TV-WLAN 108. Therefore, such a wireless communication device does not belong to a trusted visitor of home user 110. Accordingly, such a wireless communication device is not permitted to connect to TV-WLAN 108.

Returning to FIG. 2, if it is determined that the TV ID is the same as the second TV ID (Y at S218), then a permission is generated (S220). In an example embodiment, the trusted visitor management component generates a permission based on the stored trusted visitor identification and the second received trusted visitor identification, wherein the permission is generated as a trusted visitor permission when the trusted visitor identification corresponds to the stored trusted visitor identification.

For example, as shown in FIG. 3, TVMC 312 generates a permission based on the second received TV ID and the previously stored TV ID from memory 314. If comparator 316 determines the second received TV ID is the same as the previously stored TV ID from memory 314, the TVMC 312 provides a trusted visitor permission to network component 308.

Returning to FIG. 2, after a permission is generated (S220), the trusted visitor is connected to the TV-WLAN (S222). In an example embodiment, network component 308 connects the trusted visitor wireless communication device to the TV-WLAN based on the permission provided by TVMC 312.

When network component 308 receives a trusted visitor permission in response to a received TV ID from a wireless communication device seeking to connect with TV-WLAN 108, the network component 308 enables the connection.

In the situation where the second received TV ID does not correspond to the previously stored TV ID, then the wireless communication device that is attempting to connect with TV-WLAN 108 is not a communication device that has previously connected with TV-WLAN 108. Therefore, such a wireless communication device does not belong to a trusted visitor of home user 110.

Thus, it should be noted that memory 314 may store TV IDs for multiple trusted visitors. In such a case, when a person attempts to connect with TV-WLAN 108, the transmitted TV ID may be compared with all the TV IDs stored in memory 314. Therefore, if a second previously registered trusted visitor attempts to connect to TV-WLAN 108, the second previously registered trusted visitor's TV ID may be compared with a first stored TV ID in memory 314 and a second stored TV ID in memory 314.

Returning to FIG. 2, after the trusted visitor is connected to the TV-WLAN (S222), prior art method 200 stops (S224).

In prior art LAN 100 and prior art method 200 discussed above with reference to FIGS. 1-6, a trusted visitor may visit home 102 and connect with TV-WLAN 108, before home user 110 even knows of the presence of such a trusted visitor. For example, home user 110 may be in an upstairs bedroom watching television, wherein a trusted visitor is approaching home 102. In such a case, the trusted visitor may connect to TV-WLAN 108 without home user 110 even knowing.

Further in prior art LAN 100 and prior art method 200 discussed above with reference to FIGS. 1-6, a trusted visitor may visit home 102 and connect with TV-WLAN 108, even when home user 110 is not at home 102. For example, home user 110 may be away from home 102, wherein a trusted visitor visits home 102 in an attempt to meet with home user 110. Since home user 110 is not home, the trusted visitor may then leave, wherein home user 110 would never know of the missed visit.

Aspects of the present invention solve the above-described problems. A system and method of alerting a primary user of a trusted visitor in a dual wireless network, in accordance with aspects of the present invention will now be described with reference to FIGS. 7-13.

Figure 7:
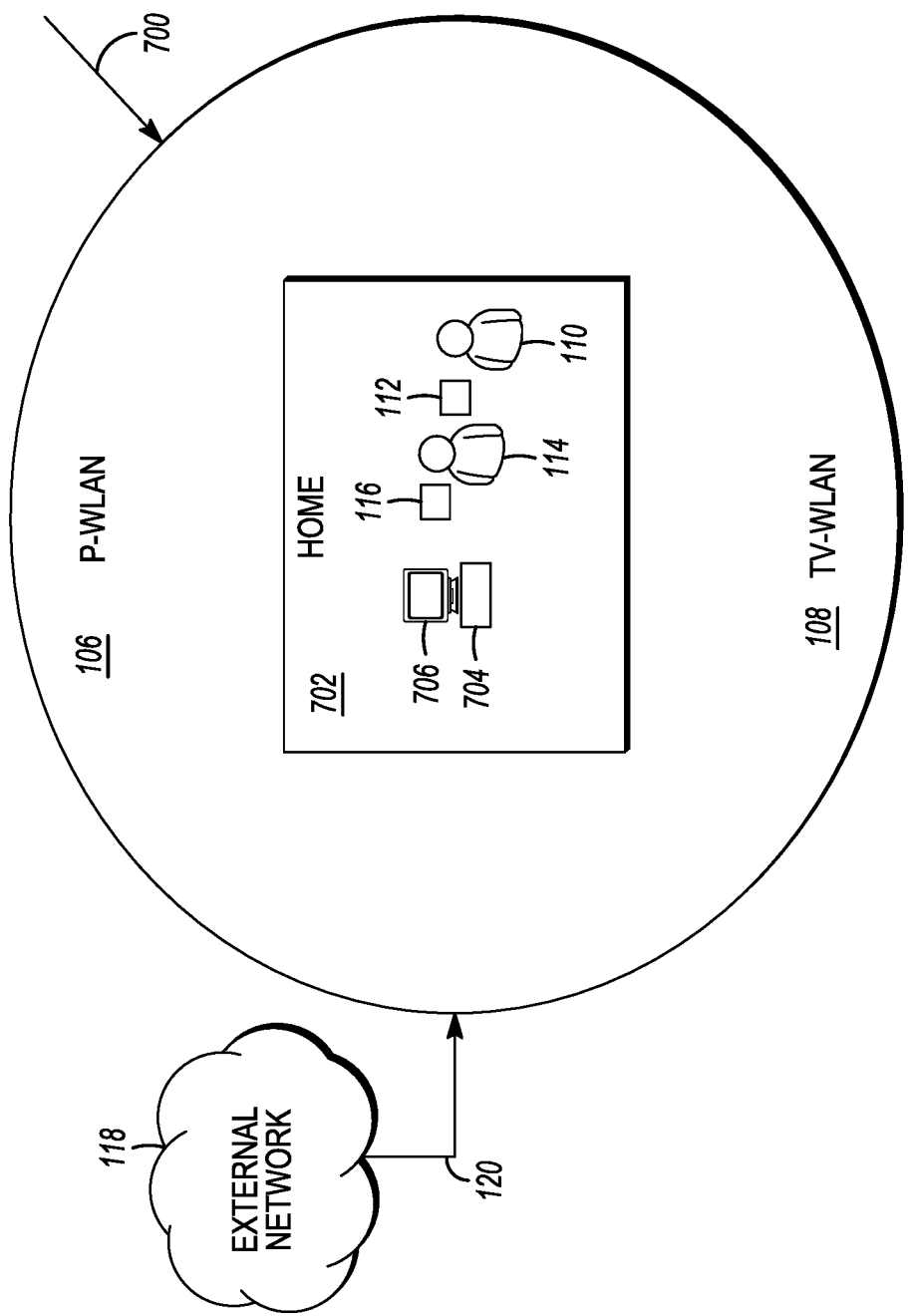
FIG. 7 illustrates a home LAN, in accordance with aspects of the present invention, at a time $t_5$.

FIG. 7 illustrates a home local area network (LAN) 700, in accordance with aspects of the present invention, at a time $t_5$.

As shown in FIG. 7, home LAN 700 includes a home 702, a network device 704, a television 706, P-WLAN 106, TV-WLAN 108, home user 110, wireless communication device 112 of home user 110, visitor 114, wireless communication device 116 of visitor 114 and external network 118.

Network device 704 is any device or system that is able to create and manage P-WLAN 106, create and manage TV-WLAN 108, communicate with external network 118 via a communication channel 120 and provide content to television 706.

Television 706 may be any device or system that is able to display content provided by network device 704.

Figure 8:
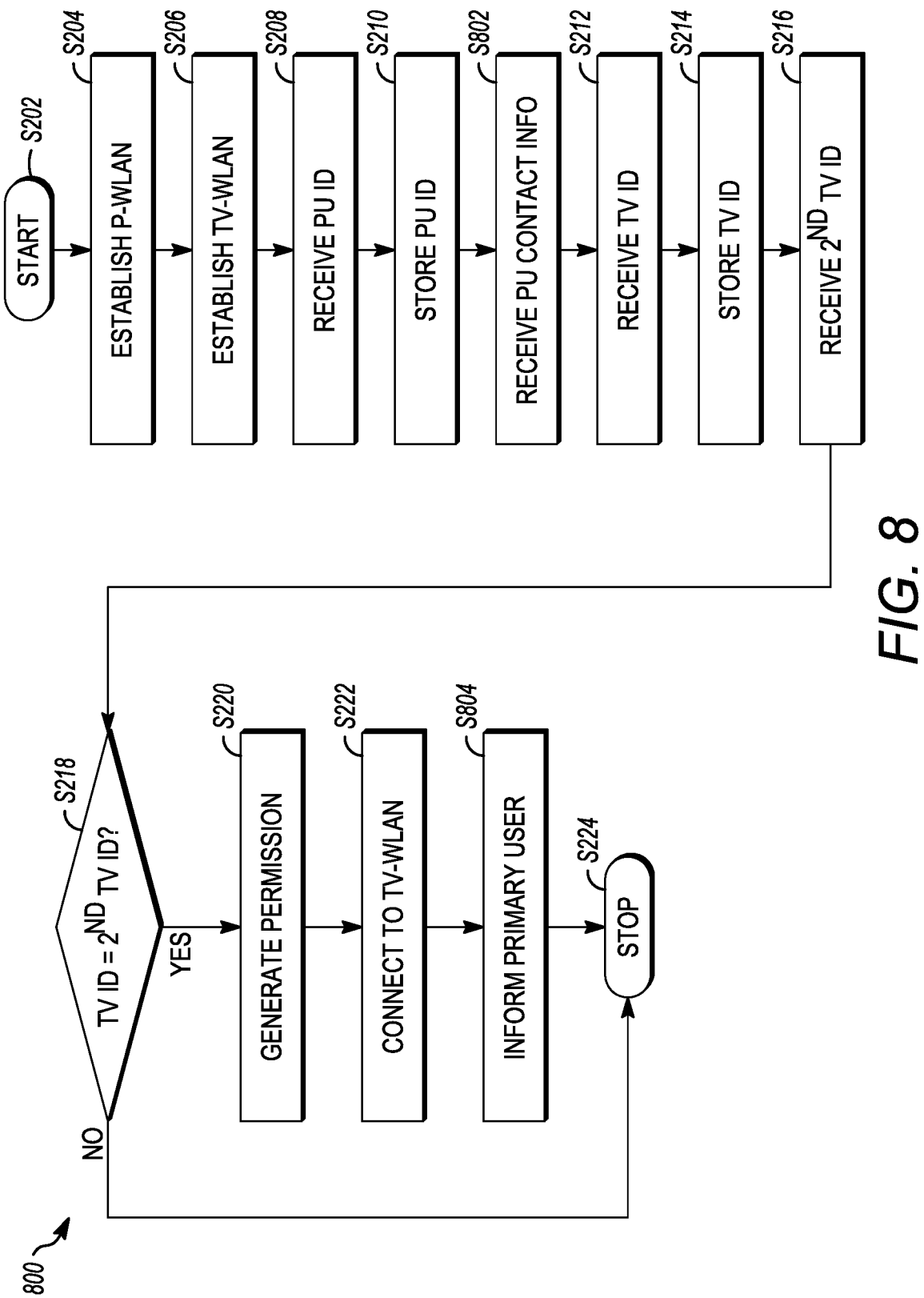
FIG. 8 illustrates an example method of operating a dual wireless network in accordance with aspects of the present invention.

FIG. 8 illustrates an example method 800 of operating a dual wireless network in accordance with aspects of the present invention.

As shown in FIG. 8, method 800 has portions that are similar to prior art method 200 discussed above with reference to FIG. 2. In particular, method 800 starts (S202), a P-WLAN is established (S204), a TV-WLAN is established (S206), the PU ID is received (S208), and the PU ID is stored (S210).

Method 800 differs from prior art method 200 in that after the PU ID is stored (S210), but prior to the TV ID being received (S212), primary user contact information is received (S802). This will be described in greater detail with additional reference to FIG. 9.

Figure 9:
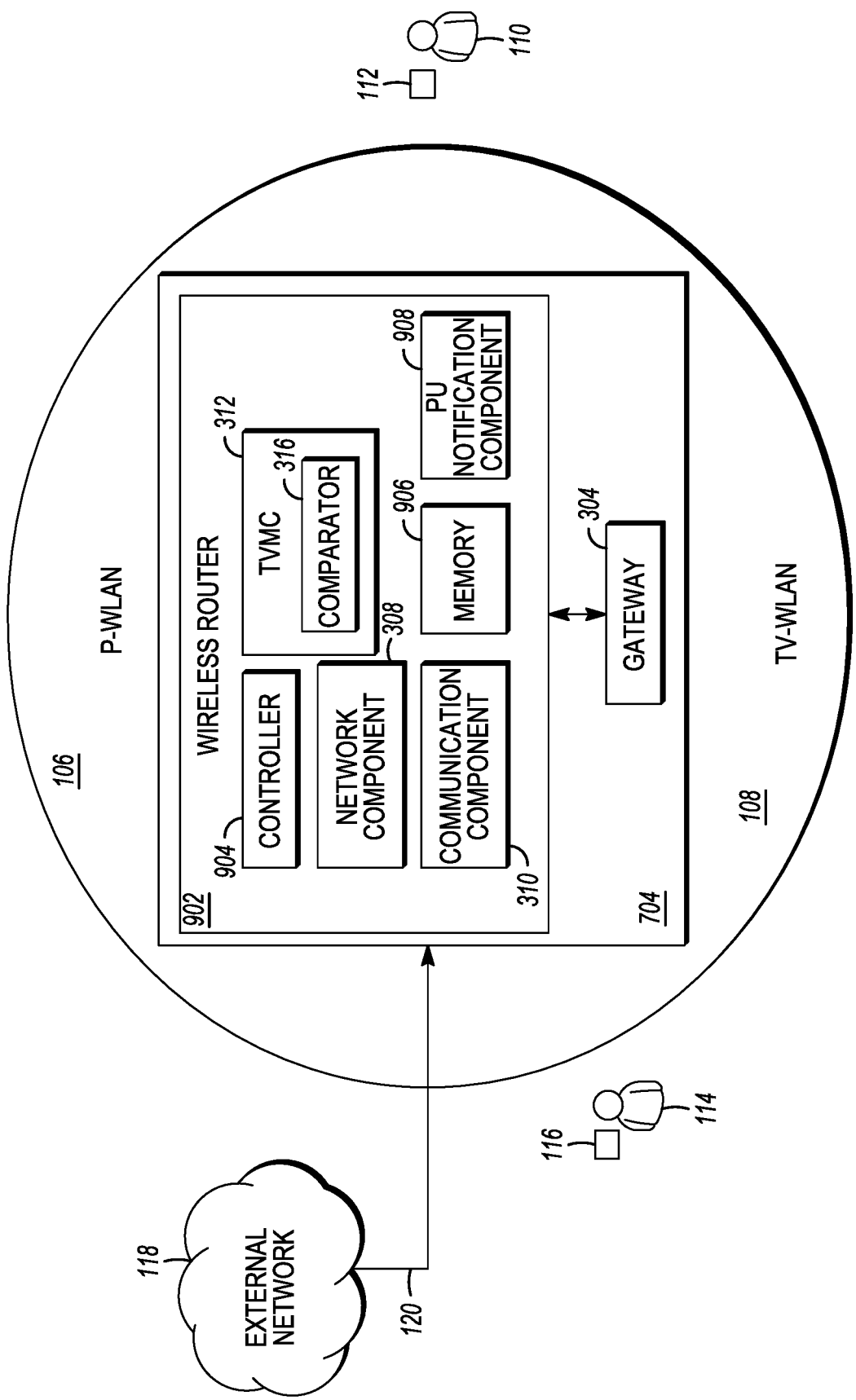
FIG. 9 illustrates an exploded view of the network device of FIG. 7.

FIG. 9 illustrates an exploded view of network device 704 of FIG. 7.

As shown in FIG. 9, network device 704 includes a wireless router 902 and gateway 304. Wireless router 902 includes a controller 904, network component 308, communication component 310, TVMC 312, a memory 906 and a primary user (PU) notification component 908.

In this example, wireless router 902 and gateway 304 are illustrated as individual devices. However, in some embodiments, wireless router 902 and gateway 304 may be combined as a unitary device. Further, in some embodiments, at least one of wireless router 902 and gateway 304 may be implemented as a computer having tangible computer-readable media for carrying or having computer-executable instructions or data structures stored thereon.

Wireless router 902 may be any device or system that is able to forward data packets between similar networks. Wireless router 902 is able to establish wireless networks for communication with wireless communication device 112 and wireless communication device 116.

In this example, controller 904, network component 308, communication component 310, TVMC 312, memory 906 and PU notification component 908 are illustrated as individual devices. However, in some embodiments, at least two of controller 904, network component 308, communication component 310, TVMC 312, memory 906 and PU notification component 908 may be combined as a unitary device. Further, in some embodiments, at least one of controller 904, network component 308, communication component 310, TVMC 312, memory 906 and PU notification component 908 may be implemented as a computer having tangible computer-readable media for carrying or having computer-executable instructions or data structures stored thereon.

Controller 904 may be any device or system that is able to control operation of network component 308, communication component 310, TVMC 312, memory 906 and PU notification component 908.

Memory 906 may be any device or system that is able to store and manage data. As will be described in greater detail below, memory 906 is further able to store a stored TV ID and to store a second stored TV ID.

PU notification component 908 may be any device or system that is able to provide a notification to wireless communication device 112. As will be described in greater detail below, PU notification component 908 is further able to generate a primary user notification based on a permission generated by the TVMC, to transmit the primary user notification to the primary user wireless communication device based on the receipt of a primary user identification and to generate the primary user notification as one of the group consisting of a text message, an email, a phone call, a television display message, a computer display message and combinations thereof.

Returning to FIG. 8, after the primary user contact information has been received (S802), method 800 has still further portions that are similar to prior art method 200 discussed above with reference to FIG. 2. In particular, in method 800, after the primary user contact information has been received (S802), the TV ID is received (S212), the TV ID is stored (S214), the second TV ID is received (S216), it is determined whether the TV ID is the same as the second TV ID (S218), if it is determined that the TV ID is not the same as the second TV ID (N at S218), then method 800 stops (S224)—if it is determined that the TV ID is the same as the second TV ID (Y at S218), then a permission is generated (S220) and the trusted visitor is connected to the TV-WLAN (S222).

Method 800 further differs from prior art method 200 in that after the trusted visitor is connected to the TV-WLAN (S222), but prior to method 800 stopping (S224), the primary user is informed (S802). In an example embodiment, PU notification component 908 generates a primary user notification based on the permission generated by TVMC 312. This will be described in greater detail with additional reference to FIGS. 10-12.

In accordance with aspects of the present invention, home user 110 may share the password to TV-WLAN 108, for example, a Wi-Fi passphrase, for trusted visitor clients' use of TV-WLAN 108 while they visit home 102 (e.g., using their mobile phones). At the same time, TVMC 312 of network device 704 adds the TV IDs associated with these trusted visitor clients to memory 906. The client details (e.g., MAC address) are stored in memory 906 even after the associated wireless communication devices are disconnected.

When network device 704 again detects the proximity of a communication device of a trusted visitor by way of a connection request of their wireless communication device, PU notification component 908 of network device 704 alerts the primary user to their presence.

As mentioned above, there are two non-limiting example use scenarios in accordance with aspects of the present invention. The first use scenario deals with security and will be described in greater detail with reference to FIG. 10 below, and the second use scenario deals with a missed visit alert and will be described in greater detail with reference to FIGS. 11-13 below.

Figure 10:
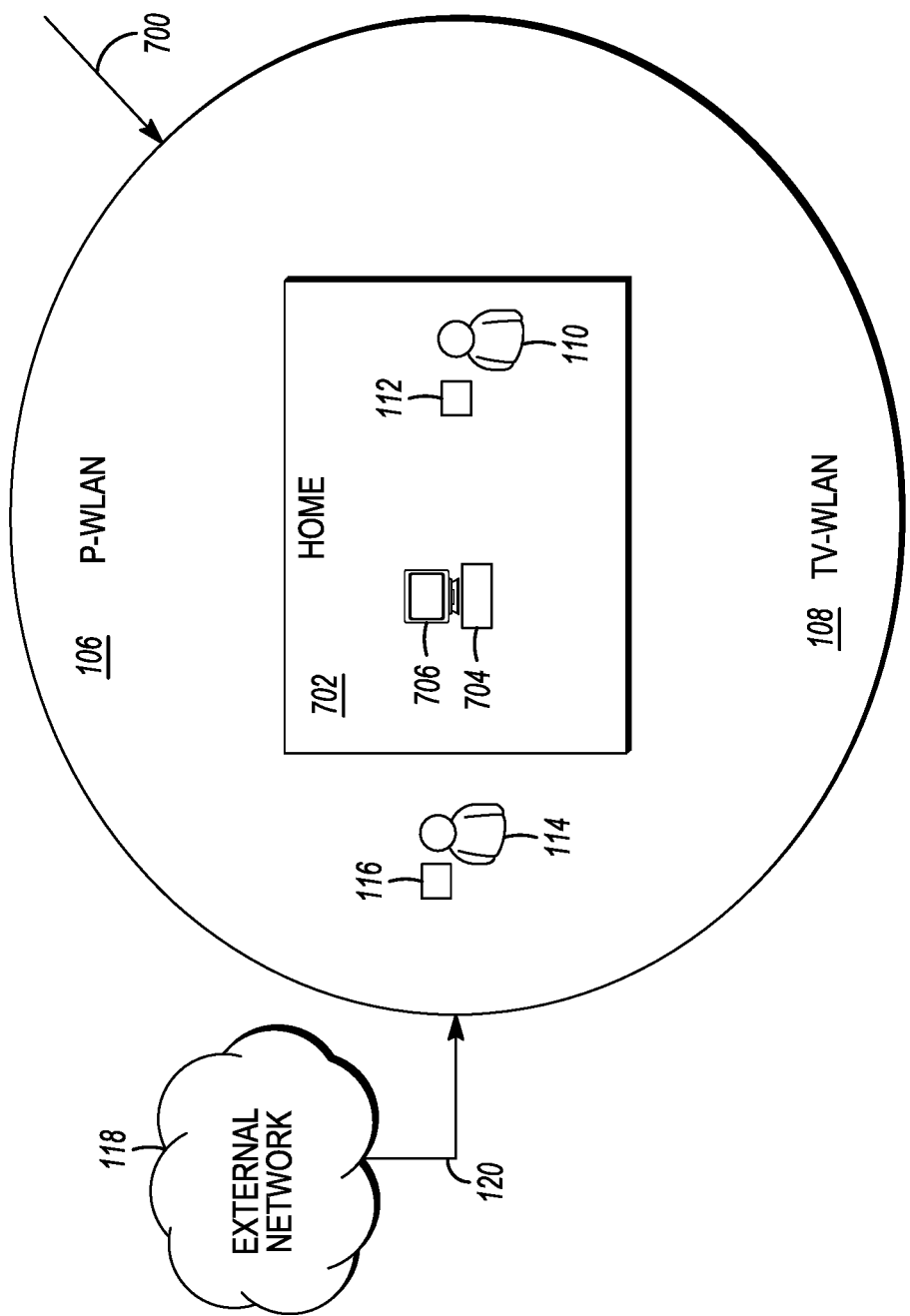
FIG. 10 illustrates a security feature usage of the home LAN of FIG. 7, in accordance with aspects of the present invention, at a time $t_6$.

FIG. 10 illustrates a security feature usage of home LAN 700, in accordance with aspects of the present invention, at a time $t_6$.

Consider the situation where visitor 114 has previously registered wireless communication device 116 with network device 704 so as to use TV-WLAN 108 when visitor 114 is in a connectable area of TV-WLAN 108. For example, as shown in FIG. 8, method 800 has been performed up until the TV ID of wireless communication device 116 has been stored (S214).

Further, in this situation as illustrated in FIG. 10, home user 110 is at home 702, is connected to P-WLAN 106 and is watching a movie on television 706. Finally, now presume that visitor 114 has approached home 702 in order to visit with home user 110.

Once within a detectable range of TV-WLAN 108, wireless communication device 116 sends a request to connect to TV-WLAN 108, wherein the request includes the TV ID of wireless communication device 116 (note S216 of FIG. 8).

As shown in FIG. 9, comparator 316 of TVMC 312 compares the newly received TV ID of wireless communication device 116 and compares it with stored TV IDs in memory 906. In this case, TVMC 312 determines that the newly received TV ID from wireless communication device 116 is the same as a previously registered TV ID that was stored in memory 906 (note Y in S218 of FIG. 8). Permission is granted (S220) and wireless communication device 116 connects to TV-WLAN 108 (S222).

At this point, as shown in FIG. 9, PU notification component 908 alerts home user 110 (note S804 of FIG. 8) as to the identify of visitor 114, who is close enough to be connected to TV-WLAN 108.

In this manner, returning to FIG. 10, as soon as visitor 114 knocks on the door of the home at time $t_6$, home user 110 may be notified as to who is visiting home 702 prior to opening the door.

In some example embodiments, PU notification component 908 transmits the primary user notification to wireless communication device 112 of home user 110. The notification may take the form of a text message, an email, a phone call or combinations thereof. Further, in some embodiments, PU notification component 908 transmits the primary user notification to television 706, wherein the notification may take the form of a television display message. It should be noted that in still further embodiments, PU notification component 908 may transmit the primary user notification to a computer (not shown) of home user 110 as a computer display message.

Figure 11:
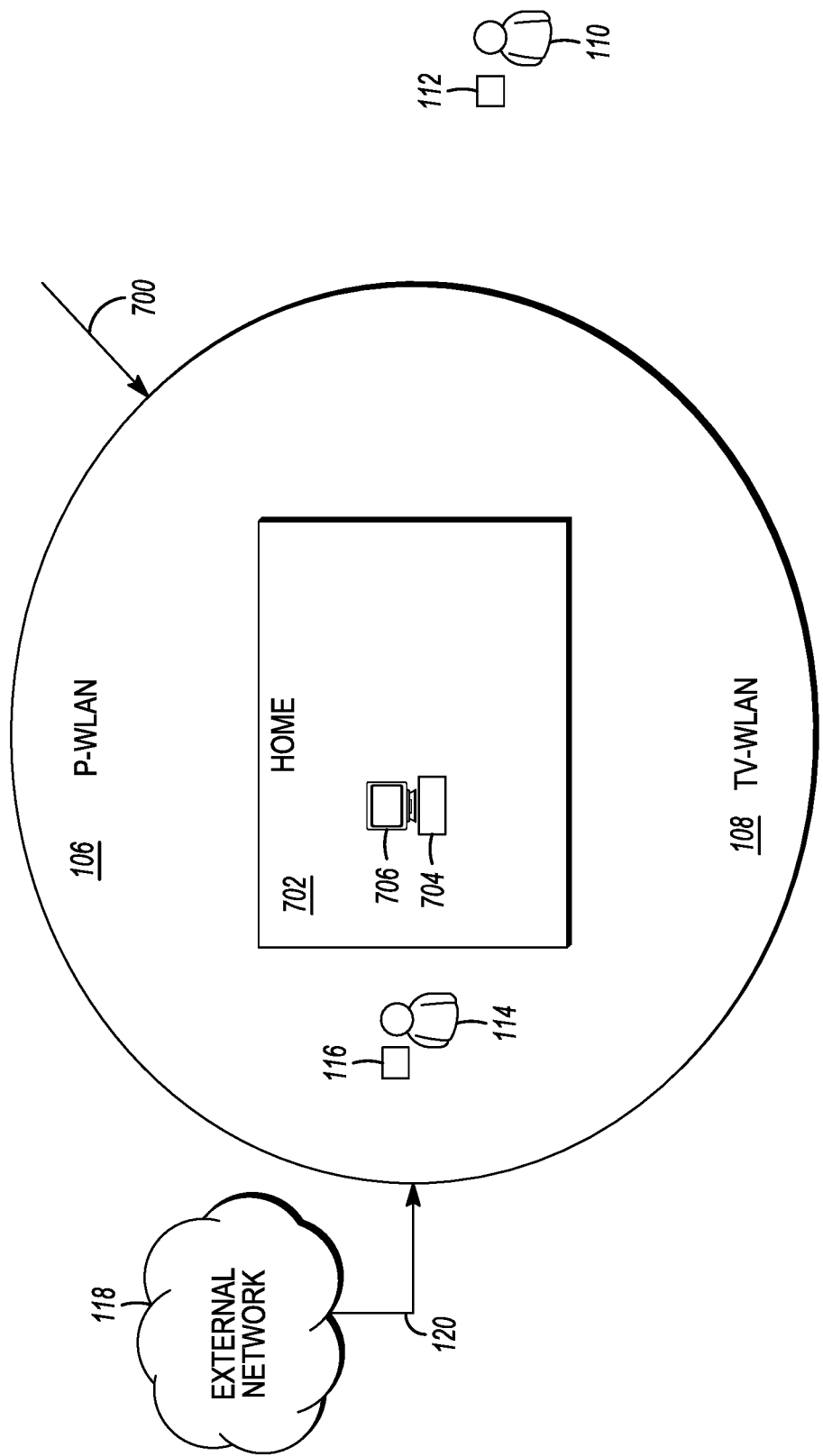
FIG. 11 illustrates a missed visitor alert feature of the home LAN of FIG. 7, in accordance with aspects of the present invention, at a time $t_7$.

FIG. 11 illustrates a missed visitor alert feature of home LAN 700, in accordance with aspects of the present invention, at a time $t_7$.

Consider the situation where visitor 114 has previously registered wireless communication device 116 with network device 704 so as to use TV-WLAN 108 when visitor 114 is in a connectable area of TV-WLAN 108. For example, as shown in FIG. 8, method 800 has been performed up until the TV ID of wireless communication device 116 has been stored (S214).

Further, in this situation as illustrated in FIG. 11, home user 110 is not at home 702, and is therefore not connected to P-WLAN 106. Finally, now presume that visitor 114 has approached home 702.

Once within a detectable range of TV-WLAN 108, wireless communication device 116 sends a request to connect to TV-WLAN 108, wherein the request includes the TV ID of wireless communication device 116 (note S216 of FIG. 8).

As shown in FIG. 9, comparator 316 of TVMC 312 compares the newly received TV ID of wireless communication device 116 and compares it with stored TV IDs in memory 906. In this case, TVMC 312 determines that the newly received TV ID from wireless communication device 116 is the same as a previously registered TV ID that was stored in memory 906 (note Y in S218 of FIG. 8). Permission is granted (S220) and wireless communication device 116 connects to TV-WLAN 108 (S222).

In accordance with another aspect of the present invention, the informing of the primary user of a trusted visitor (please note S804) of method 800 is replaced with the informing of the primary user of a missed visit of a trusted visitor. This will be described in greater detail with reference to FIGS. 12-13.

Figure 12:
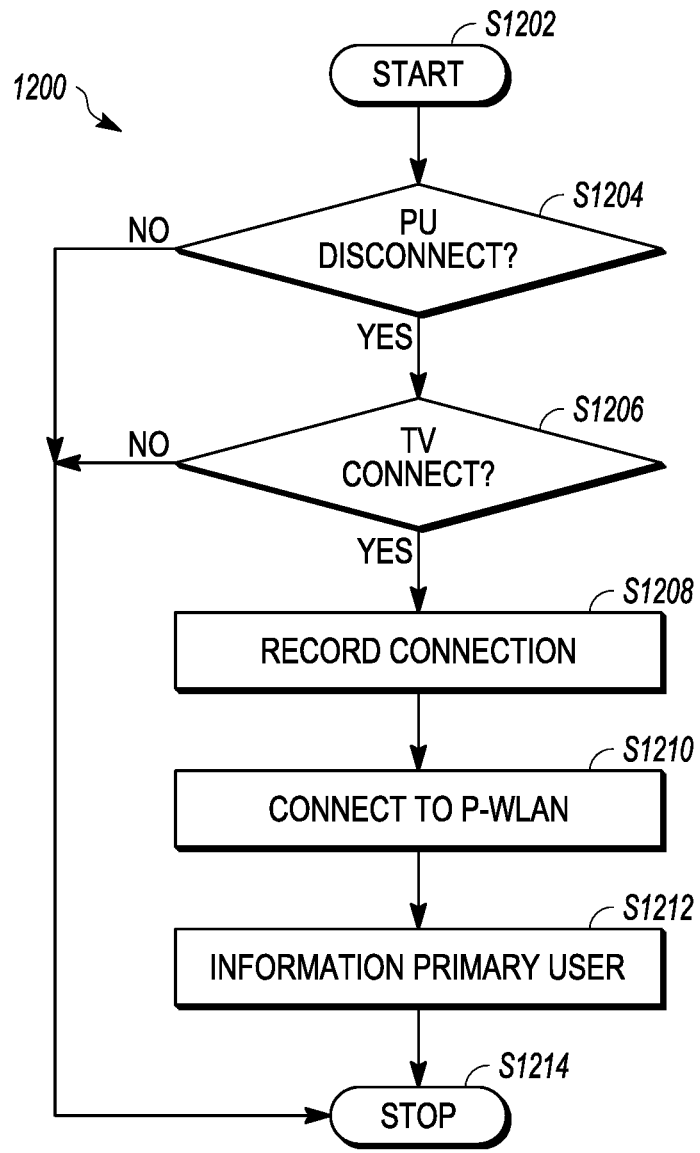
FIG. 12 illustrates an example method of alerting a home user of a missed visit by a registered trusted visitor in accordance with aspects of the present invention.

FIG. 12 illustrates an example method 1200 of alerting an home user of a missed visit by a registered trusted visitor in accordance with aspects of the present invention.

As shown in FIG. 12, method 1200 starts (S1202) and it is determined whether the primary user has disconnected from P-WLAN 106 (S1204). If it is determined that the primary user has not disconnected from P-WLAN 106 (N at S1204), then method 1200 stops (S1214).

Otherwise, it is determined that the primary user has disconnected from P-WLAN 106 (Y at S1204). In an example embodiment, as shown in FIG. 9, when home user 110 leaves home 702, so as to be outside the area of P-WLAN 106, network component 308 detects a disconnection of the wireless communication device 112 of home user 110 from the P-WLAN 106.

In an example embodiment, network component 308 instructs PU notification component 908 that wireless communication device 112 is no longer connected to P-WLAN 106. Network component 308 additionally instructs TVMC 312 to store any instances of connections of registered trusted visitors into memory 906, while wireless communication device 112 remains disconnected to P-WLAN 106. Network component 308 further sets a flag to instruct PU notification component 908 to notify wireless communication device 112 of any stored instances of connections of registered trusted visitors that occurred while wireless communication device 112 was disconnected to P-WLAN 106, when wireless communication device 112 reconnects with P-WLAN 106.

Returning to FIG. 12, after it is determined that the primary user has disconnected from P-WLAN 106 (Y at S1204), then it is determined whether a previously registered trusted visitor has connected to TV-WLAN 108 (S1206). If it is determined that a previously registered trusted visitor has not connected to TV-WLAN 108 (N at S1206), then method 1200 stops (S1214).

Otherwise, it is determined that a previously registered trusted visitor has connected to TV-WLAN 108 (Y at S1204). This may be determined in a manner similar to that discussed above with reference to prior art method 200, starting with receiving a second TV ID (S216) through connecting to TV-WLAN (S222).

Returning to FIG. 12, after a previously registered trusted visitor has connected to TV-WLAN 108 (Y at S1204), the connection is recorded (S1208). For example, as shown in FIG. 9, TVMC 312 store all instances of connections of registered trusted visitors into memory 906, while wireless communication device 112 remains disconnected to P-WLAN 106.

Returning to FIG. 12, after the connection is recorded (S1208), the primary user connects to P-WLAN 106 (S1210). This will be described with additional reference to FIG. 13.

Figure 13:
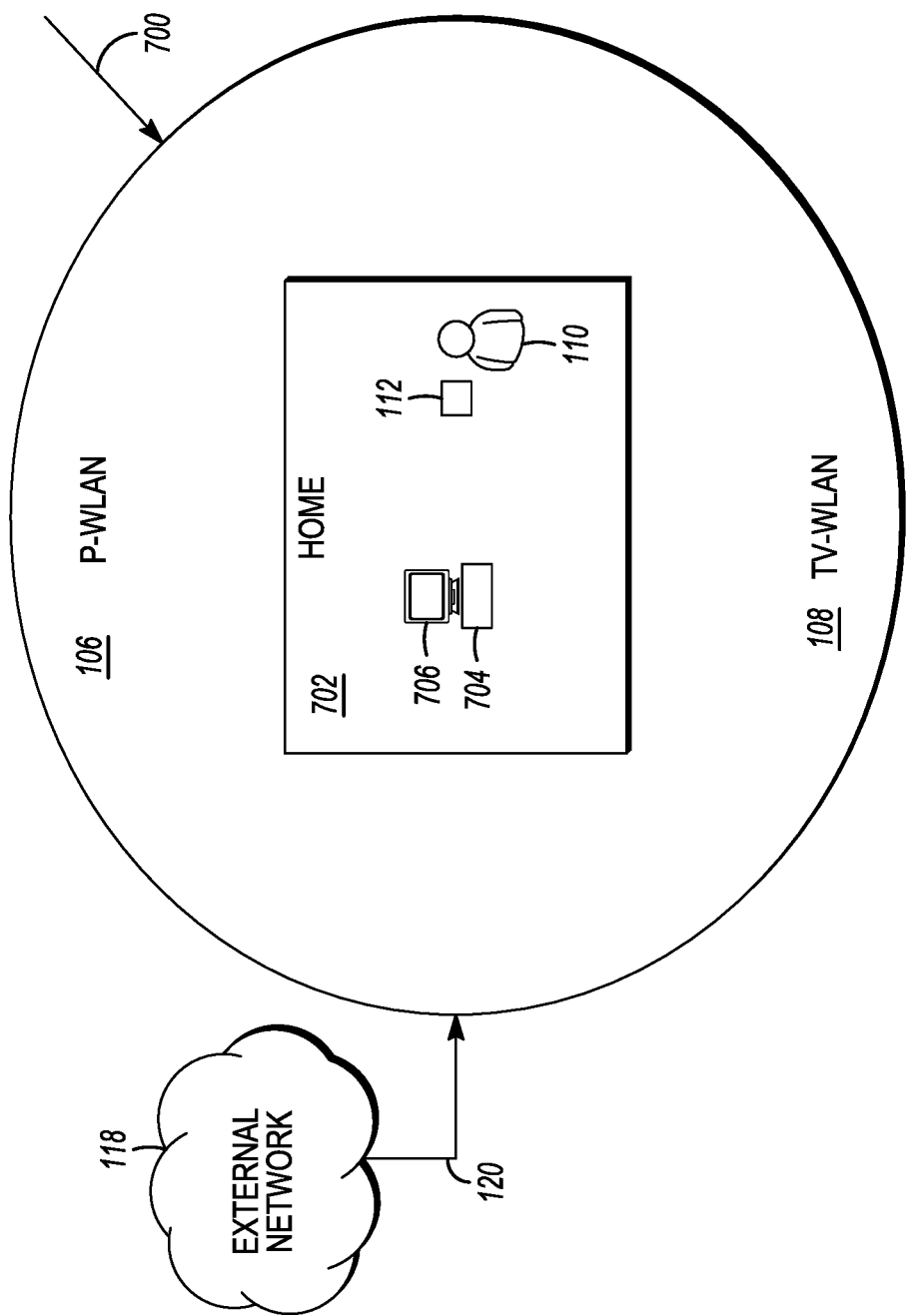
FIG. 13 illustrates the missed visitor alert feature of the home LAN of FIG. 7, in accordance with aspects of the present invention, at a time $t_8$.

FIG. 13 illustrates the missed visitor alert feature of home LAN 700, in accordance with aspects of the present invention, at a time $t_8$.

As shown in FIG. 13, home user 110 is back inside home 702, such that wireless communication device 112 is able to connect with P-WLAN 106. For example, as shown in FIG. 9, wireless communication device 112 reconnects with P-WLAN 106 by known methods using the previously stored password for P-WLAN 106.

Returning to FIG. 12, after the primary user connects to P-WLAN 106 (S1210), the primary user is informed of the missed visit (S1212). For example, as shown in FIG. 9, the flag that was previously set by network component 308 is tripped when wireless communication device 112 reconnects with P-WLAN 106. In response to the trip of the flag, PU notification component 908 notifies wireless communication device 112 of any stored instances of connections of registered trusted visitors that occurred while wireless communication device 112 was disconnected to P-WLAN 106.

After the primary user is informed of the missed visit (S1212), method 1200 stops (S1214).

In some example embodiments, PU notification component 908 transmits the primary user notification to wireless communication device 112 of home user 110. The notification may take the form of a text message, an email, a phone call or combinations thereof. Further, in some embodiments, PU notification component 908 transmits the primary user notification to television 706, wherein the notification may take the form of a television display message. In still further embodiments, PU notification component 908 may transmit the primary user notification to a computer (not shown) of home user 110 as a computer display message.

It should be noted that in the non-limiting example embodiments discussed above, a single trusted visitor and a single user is described. However, any number of trusted visitors or users may use a system and method in accordance with aspects of the present invention.

The foregoing description of various preferred embodiments has been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A wireless communication device for use with a primary user wireless communication device and a trusted visitor wireless communication device, the primary user wireless communication device being operable to transmit a primary user identification, the trusted visitor wireless communication device being operable to transmit a trusted visitor identification, the wireless communication device comprising:

a network component operable to establish a primary wireless local area network and to establish a trusted visitor wireless local area network;

a wireless communication component operable to receive the primary user identification and to receive the trusted visitor identification;

a memory operable to store a stored trusted visitor identification;

a trusted visitor management component operable to generate a permission based on the stored trusted visitor identification and the trusted visitor identification; and a primary user notification component operable to generate a primary user notification based on the permission;

wherein the network component is operable to connect the trusted visitor wireless communication device to the trusted visitor wireless local area network based on the permission;

wherein the primary user notification component is operable to generate the primary user notification as one of a group consisting of a text message, an email, a phone call, a television display message, a computer display message and combinations thereof.

2. The wireless communication device of claim 1, wherein the trusted visitor management component comprises a comparator operable to compare the trusted visitor identification with the stored trusted visitor identification;

wherein the trusted visitor management component is further operable to generate the permission as a trusted visitor permission when the trusted visitor identification corresponds to the stored trusted visitor identification; and wherein the trusted visitor management component is further operable to generate the permission as an untrusted visitor permission when the trusted visitor identification does not correspond to the stored trusted visitor identification.

3. The wireless communication device of claim 2, wherein the memory is further operable to store a second stored trusted visitor identification;

wherein the comparator is operable to compare the trusted visitor identification with the second stored trusted visitor identification;

wherein the trusted visitor management component is further operable to generate the permission as the trusted visitor permission when the trusted visitor identification corresponds to the second stored trusted visitor identification; and wherein the trusted visitor management component is further operable to generate the permission as the untrusted visitor permission when the trusted visitor identification does not correspond to the stored trusted visitor identification and does not correspond to the second stored trusted visitor identification.

4. A wireless communication device for use with a primary user wireless communication device and a trusted visitor wireless communication device, the primary user wireless communication device being operable to transmit a primary user identification, the trusted visitor wireless communication device being operable to transmit a trusted visitor identification, the wireless communication device comprising:
- a network component operable to establish a primary wireless local area network and to establish a trusted visitor wireless local area network;
- a wireless communication component operable to receive the primary user identification and to receive the trusted visitor identification;
- a memory operable to store a stored trusted visitor identification;
- a trusted visitor management component operable to generate a permission based on the stored trusted visitor identification and the trusted visitor identification; and
- a primary user notification component operable to generate a primary user notification based on the permission;
- wherein the network component is operable to connect the trusted visitor wireless communication device to the trusted visitor wireless local area network based on the permission;
- wherein the trusted visitor management component comprises a comparator operable to compare the trusted visitor identification with the stored trusted visitor identification;
- wherein the trusted visitor management component is further operable to generate the permission as a trusted visitor permission when the trusted visitor identification corresponds to the stored trusted visitor identification;
- wherein the trusted visitor management component is further operable to generate the permission as an untrusted visitor permission when the trusted visitor identification does not correspond to the stored trusted visitor identification;
- wherein the memory is further operable to store a second stored trusted visitor identification;
- wherein the comparator is operable to compare the trusted visitor identification with the second stored trusted visitor identification;
- wherein the trusted visitor management component is further operable to generate the permission as the trusted visitor permission when the trusted visitor identification corresponds to the second stored trusted visitor identification;
- wherein the trusted visitor management component is further operable to generate the permission as the untrusted visitor permission when the trusted visitor identification does not correspond to the stored trusted visitor identification and does not correspond to the second stored trusted visitor identification;
- wherein the network component is further operable to detect a disconnection of the primary user wireless communication device from the primary wireless local area network at a time t1;
- wherein the wireless communication component is further operable to receive the trusted visitor identification at a time t2, after the time t1;
- wherein the wireless communication component is further operable to receive the primary user identification at a time t3, after the time t2; and
- wherein the primary user notification component is further operable to transmit the primary user notification to the primary user wireless communication device based on receipt of the primary user identification at the time t3.

5. The wireless communication device of claim 4, wherein the primary user notification component is operable to generate the primary user notification as one of a group consisting of a text message, an email, a phone call, a television display message, a computer display message and combinations thereof.

6. The wireless communication device of claim 1, A wireless communication device for use with a primary user wireless communication device and a trusted visitor wireless communication device, the primary user wireless communication device being operable to transmit a primary user identification, the trusted visitor wireless communication device being operable to transmit a trusted visitor identification, the wireless communication device comprising:
- a network component operable to establish a primary wireless local area network and to establish a trusted visitor wireless local area network;
- a wireless communication component operable to receive the primary user identification and to receive the trusted visitor identification;
- a memory operable to store a stored trusted visitor identification;
- a trusted visitor management component operable to generate a permission based on the stored trusted visitor identification and the trusted visitor identification; and
- a primary user notification component operable to generate a primary user notification based on the permission;
- wherein the network component is operable to connect the trusted visitor wireless communication device to the trusted visitor wireless local area network based on the permission;
- wherein the network component is further operable to detect a disconnection of the primary user wireless communication device from the primary wireless local area network at a time t1;
- wherein the wireless communication component is further operable to receive the trusted visitor identification at a time t2, after the time t1;
- wherein the wireless communication component is further operable to receive the primary user identification at a time t3, after the time t2; and
- wherein the primary user notification component is further operable to transmit the primary user notification to the primary user wireless communication device based on receipt of the primary user identification at the time t3.

7. A method of using a primary user wireless communication device and a trusted visitor wireless communication device, the primary user wireless communication device being operable to transmit a primary user identification, the trusted visitor wireless communication device being operable to transmit a trusted visitor identification, the method comprising:
- establishing, via a network component, a primary wireless local area network;
- establishing, via the network component, a trusted visitor wireless local area network;
- receiving, via a wireless communication component, the primary user identification;
- receiving, via the wireless communication component, the trusted visitor identification;
- storing, into a memory, a stored trusted visitor identification;
- generating, via a trusted visitor management component, a permission based on the stored trusted visitor identification and the trusted visitor identification;

connecting, via the network component, the trusted visitor wireless communication device to the trusted visitor wireless local area network based on the permission; and generating, via a primary user notification component, a primary user notification based on the permission;

wherein the generating, via the primary user notification component, the primary user notification based on the permission comprises generating the primary user notification as one of a group consisting of a text message, an email, a phone call, a television display message, a computer display message and combinations thereof.

8. The method of claim 7, wherein the generating, via the trusted visitor management component, the permission based on the stored trusted visitor identification and the trusted visitor identification comprises:

comparing, via a comparator, the trusted visitor identification with the stored trusted visitor identification;

generating the permission as a trusted visitor permission when the trusted visitor identification corresponds to the stored trusted visitor identification; and generating the permission as an untrusted visitor permission when the trusted visitor identification does not correspond to the stored trusted visitor identification.

9. The method of claim 8, further comprising:

storing, into the memory, a second stored trusted visitor identification;

comparing, via the comparator, the trusted visitor identification with the second stored trusted visitor identification;

generating, via the trusted visitor management component, the permission as the trusted visitor permission when the trusted visitor identification corresponds to the second stored trusted visitor identification; and generating, via the trusted visitor management component, the permission as the untrusted visitor permission when the trusted visitor identification does not correspond to the stored trusted visitor identification and does not correspond to the second stored trusted visitor identification.

10. A method of using a primary user wireless communication device and a trusted visitor wireless communication device, the primary user wireless communication device being operable to transmit a primary user identification, the trusted visitor wireless communication device being operable to transmit a trusted visitor identification, the method comprising:

establishing, via a network component, a primary wireless local area network;

establishing, via the network component, a trusted visitor wireless local area network;

receiving, via a wireless communication component, the primary user identification;

receiving, via the wireless communication component, the trusted visitor identification;

storing, into a memory, a stored trusted visitor identification;

generating, via a trusted visitor management component, a permission based on the stored trusted visitor identification and the trusted visitor identification;

connecting, via the network component, the trusted visitor wireless communication device to the trusted visitor wireless local area network based on the permission; and generating, via a primary user notification component, a primary user notification based on the permission;

wherein the generating, via the trusted visitor management component, the permission based on the stored trusted visitor identification and the trusted visitor identification comprises:

comparing, via a comparator, the trusted visitor identification with the stored trusted visitor identification;

generating the permission as a trusted visitor permission when the trusted visitor identification corresponds to the stored trusted visitor identification;

generating the permission as an untrusted visitor permission when the trusted visitor identification does not correspond to the stored trusted visitor identification;

storing, into the memory, a second stored trusted visitor identification;

comparing, via the comparator, the trusted visitor identification with the second stored trusted visitor identification;

generating, via the trusted visitor management component, the permission as the trusted visitor permission when the trusted visitor identification corresponds to the second stored trusted visitor identification;

generating, via the trusted visitor management component, the permission as the untrusted visitor permission when the trusted visitor identification does not correspond to the stored trusted visitor identification and does not correspond to the second stored trusted visitor identification;

detecting, via the network component, a disconnection of the primary user wireless communication device from the primary wireless local area network at a time t1;

receiving, via the wireless communication component, the trusted visitor identification at a time t2, after the time t1;

receiving, via the wireless communication component, the primary user identification at a time t3, after the time t2; and transmitting, via the primary user notification component, the primary user notification to the primary user wireless communication device based on receipt of the primary user identification at the time t3.

11. The method of claim 10, wherein the generating, via the primary user notification component, the primary user notification based on the permission comprises generating the primary user notification as one of a group consisting of a text message, an email, a phone call, a television display message, a computer display message and combinations thereof.

12. A method of using a primary user wireless communication device and a trusted visitor wireless communication device, the primary user wireless communication device being operable to transmit a primary user identification, the trusted visitor wireless communication device being operable to transmit a trusted visitor identification, the method comprising:

establishing, via a network component, a primary wireless local area network;

establishing, via the network component, a trusted visitor wireless local area network;

receiving, via a wireless communication component, the primary user identification;

receiving, via the wireless communication component, the trusted visitor identification;

storing, into a memory, a stored trusted visitor identification;

generating, via a trusted visitor management component, a permission based on the stored trusted visitor identification and the trusted visitor identification;

connecting, via the network component, the trusted visitor wireless communication device to the trusted visitor wireless local area network based on the permission; and generating, via a primary user notification component, a primary user notification based on the permission;

detecting, via the network component, a disconnection of the primary user wireless communication device from the primary wireless local area network at a time t1;

receiving, via the wireless communication component, the trusted visitor identification at a time t2, after the time t1;

receiving, via the wireless communication component, the primary user identification at a time t3, after the time t2; and transmitting, via the primary user notification component, the primary user notification to the primary user wireless communication device based on receipt of the primary user identification at the time t3.

13. A non-transitory, tangible, computer-readable media having computer-readable instructions stored thereon, for use with a computer and being capable of instructing the computer to perform a method of using a primary user wireless communication device and a trusted visitor wireless communication device, the primary user wireless communication device being operable to transmit a primary user identification, the trusted visitor wireless communication device being operable to transmit a trusted visitor identification, the method comprising:

establishing, via a network component, a primary wireless local area network;

establishing, via the network component, a trusted visitor wireless local area network;

receiving, via a wireless communication component, the primary user identification;

receiving, via the wireless communication component, the trusted visitor identification;

storing, into a memory, a stored trusted visitor identification;

generating, via a trusted visitor management component, a permission based on the stored trusted visitor identification and the trusted visitor identification;

connecting, via the network component, the trusted visitor wireless communication device to the trusted visitor wireless local area network based on the permission; and generating, via a primary user notification component, a primary user notification based on the permission;

wherein the computer-readable instructions are capable of instructing the computer to perform the method wherein the generating, via the primary user notification component, the primary user notification based on the permission comprises generating the primary user notification as one of a group consisting of a text message, an email, a phone call, a television display message, a computer display message and combinations thereof.

14. The non-transitory, tangible, computer-readable media of claim 13, the computer-readable instructions stored thereon being capable of instructing the computer to perform the method, wherein the generating, via the trusted visitor management component, the permission based on the stored trusted visitor identification and the trusted visitor identification comprises:

comparing, via a comparator, the trusted visitor identification with the stored trusted visitor identification;

generating the permission as a trusted visitor permission when the trusted visitor identification corresponds to the stored trusted visitor identification; and generating the permission as an untrusted visitor permission when the trusted visitor identification does not correspond to the stored trusted visitor identification.

15. The non-transitory, tangible, computer-readable media of claim 14, the computer-readable instructions stored thereon being capable of instructing the computer to perform the method further comprising:

storing, into the memory, a second stored trusted visitor identification;

comparing, via the comparator, the trusted visitor identification with the second stored trusted visitor identification;

generating, via the trusted visitor management component, the permission as the trusted visitor permission when the trusted visitor identification corresponds to the second stored trusted visitor identification; and generating, via the trusted visitor management component, the permission as the untrusted visitor permission when the trusted visitor identification does not correspond to the stored trusted visitor identification and does not correspond to the second stored trusted visitor identification.

16. A non-transitory, tangible, computer-readable media having computer-readable instructions stored thereon, for use with a computer and being capable of instructing the computer to perform a method of using a primary user wireless communication device and a trusted visitor wireless communication device, the primary user wireless communication device being operable to transmit a primary user identification, the trusted visitor wireless communication device being operable to transmit a trusted visitor identification, the method comprising:

establishing, via a network component, a primary wireless local area network;

establishing, via the network component, a trusted visitor wireless local area network;

receiving, via a wireless communication component, the primary user identification;

receiving, via the wireless communication component, the trusted visitor identification;

storing, into a memory, a stored trusted visitor identification;

generating, via a trusted visitor management component, a permission based on the stored trusted visitor identification and the trusted visitor identification;

connecting, via the network component, the trusted visitor wireless communication device to the trusted visitor wireless local area network based on the permission;

generating, via a primary user notification component, a primary user notification based on the permission;

wherein the generating, via the trusted visitor management component, the permission based on the stored trusted visitor identification and the trusted visitor identification comprises:

comparing, via a comparator, the trusted visitor identification with the stored trusted visitor identification;

generating the permission as a trusted visitor permission when the trusted visitor identification corresponds to the stored trusted visitor identification;

generating the permission as an untrusted visitor permission when the trusted visitor identification does not correspond to the stored trusted visitor identification;

storing, into the memory, a second stored trusted visitor identification;

comparing, via the comparator, the trusted visitor identification with the second stored trusted visitor identification;

generating, via the trusted visitor management component, the permission as the trusted visitor permission when the trusted visitor identification corresponds to the second stored trusted visitor identification;

generating, via the trusted visitor management component, the permission as the untrusted visitor permission when the trusted visitor identification does not correspond to the stored trusted visitor identification and does not correspond to the second stored trusted visitor identification;

detecting, via the network component, a disconnection of the primary user wireless communication device from the primary wireless local area network at a time t1;

receiving, via the wireless communication component, the trusted visitor identification at a time t2, after the time t1;

receiving, via the wireless communication component, the primary user identification at a time t3, after the time t2; and transmitting, via the primary user notification component, the primary user notification to the primary user wireless communication device based on receipt of the primary user identification at the time t3.

17. A non-transitory, tangible, computer-readable media having computer-readable instructions stored thereon, for use with a computer and being capable of instructing the computer to perform a method of using a primary user wireless communication device and a trusted visitor wireless communication device, the primary user wireless communication device being operable to transmit a primary user identification, the trusted visitor wireless communication device being operable to transmit a trusted visitor identification, the method comprising:

establishing, via a network component, a primary wireless local area network;

establishing, via the network component, a trusted visitor wireless local area network;

receiving, via a wireless communication component, the primary user identification;

receiving, via the wireless communication component, the trusted visitor identification;

storing, into a memory, a stored trusted visitor identification;

generating, via a trusted visitor management component, a permission based on the stored trusted visitor identification and the trusted visitor identification;

connecting, via the network component, the trusted visitor wireless communication device to the trusted visitor wireless local area network based on the permission;

generating, via a primary user notification component, a primary user notification based on the permission;

detecting, via the network component, a disconnection of the primary user wireless communication device from the primary wireless local area network at a time t1;

receiving, via the wireless communication component, the trusted visitor identification at a time t2, after the time t1;

receiving, via the wireless communication component, the primary user identification at a time t3, after the time t2; and transmitting, via the primary user notification component, the primary user notification to the primary user wireless communication device based on receipt of the primary user identification at the time t3.

\* \* \* \* \*